US010659844B2

(12) United States Patent
Zhou

(10) Patent No.: US 10,659,844 B2
(45) Date of Patent: May 19, 2020

(54) INTERACTION METHOD AND SYSTEM BASED ON RECOMMENDED CONTENT

(71) Applicant: TENCENT TECHNOLOGY (SHENZHEN) COMPANY LIMITED, Shenzhen (CN)

(72) Inventor: Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 8 days.

(21) Appl. No.: 15/629,993

(22) Filed: Jun. 22, 2017

(65) Prior Publication Data

US 2017/0289629 A1 Oct. 5, 2017

Related U.S. Application Data

(63) Continuation of application No. PCT/CN2016/080554, filed on Apr. 28, 2016.

(30) Foreign Application Priority Data

Apr. 28, 2015 (CN) .......................... 2015 1 0208966

(51) Int. Cl.
*H04N 21/466* (2011.01)
*G06F 16/435* (2019.01)
(Continued)

(52) U.S. Cl.
CPC ....... *H04N 21/4668* (2013.01); *G06F 3/0482* (2013.01); *G06F 3/04817* (2013.01);
(Continued)

(58) Field of Classification Search
CPC ........ H04N 5/50; H04N 5/775; H04N 21/482; H04N 21/485; H04N 5/4401
See application file for complete search history.

(56) References Cited

U.S. PATENT DOCUMENTS 9,524,077 B1 * 12/2016 Pattan ................... G06F 3/0482
2002/0035601 A1 3/2002 Ullman et al.
(Continued)

FOREIGN PATENT DOCUMENTS

CN 101217639 A 7/2008
CN 103414940 A 11/2013
(Continued)

OTHER PUBLICATIONS

The World Intellectual Property Organization (WIPO) International Search Report for PCT/CN2016/080554 dated Jun. 29, 2016 Pages 1-5.

(Continued)

*Primary Examiner* — Anthony Bantamoi
(74) *Attorney, Agent, or Firm* — Anova Law Group, PLLC

(57) ABSTRACT

Interaction method and system based on recommended content are provided. The method includes: receiving a playback instruction for a multimedia file, and obtaining recommended content corresponding to the multimedia file; playing the recommended content at a designated playback time point of the multimedia file; displaying an interaction option of the recommended content in a playback interface of the recommended content in a process of playing the recommended content; and interacting with the recommended content based on the interaction option after detecting a selection operation on the interaction option. A user may trigger the selection operation on the interaction option to interact with the recommended content, rather than watching the recommended content passively, which provides the user with method and system for interacting with the recommended content, increases flexibility, enhances attractiveness of the recommended content to the user, increases (Continued)

user viscosity, and increases a conversion rate of the recommended content.

14 Claims, 9 Drawing Sheets

(51) Int. Cl.
  *G06F 16/438* (2019.01)
  *H04L 29/06* (2006.01)
  *H04N 21/6332* (2011.01)
  *H04N 21/25* (2011.01)
  *H04N 21/81* (2011.01)
  *H04L 29/08* (2006.01)
  *G06F 3/0481* (2013.01)
  *G06F 3/0482* (2013.01)
  *H04N 21/2387* (2011.01)
  *H04N 21/431* (2011.01)
  *H04N 21/472* (2011.01)
  *H04N 21/482* (2011.01)
  *H04N 21/8545* (2011.01)
  *G06F 3/0488* (2013.01)

(52) U.S. Cl.
  CPC .......... *G06F 16/435* (2019.01); *G06F 16/438* (2019.01); *H04L 29/06* (2013.01); *H04L 67/12* (2013.01); *H04L 67/42* (2013.01); *H04N 21/2387* (2013.01); *H04N 21/252* (2013.01); *H04N 21/4312* (2013.01); *H04N 21/47217* (2013.01); *H04N 21/4826* (2013.01); *H04N 21/6332* (2013.01); *H04N 21/812* (2013.01); *H04N 21/8545* (2013.01); *G06F 3/04883* (2013.01)

(56) References Cited

U.S. PATENT DOCUMENTS

| | | | |
|---|---|---|---|
| 2006/0271980 | A1 | 11/2006 | Mankovitz |
| 2009/0092374 | A1* | 4/2009 | Kulas ................ H04N 7/025 386/95 |
| 2012/0290654 | A1* | 11/2012 | Detwiller ............ G06F 15/16 |
| 2014/0215568 | A1* | 7/2014 | Kirigin ................ G06F 21/00 |
| 2015/0046951 | A1* | 2/2015 | Arunachalam .... H04N 21/8586 725/59 |
| 2015/0095949 | A1* | 4/2015 | Kim .................. H04N 21/4756 725/35 |
| 2016/0012053 | A1* | 1/2016 | Weening ............ G06F 17/3053 |
| 2016/0094875 | A1* | 3/2016 | Peterson ............ H04N 21/4312 |

FOREIGN PATENT DOCUMENTS

| | | |
|---|---|---|
| CN | 103686250 A | 3/2014 |
| CN | 103703789 A | 4/2014 |
| CN | 104023271 A | 9/2014 |
| CN | 104883358 A | 9/2015 |
| JP | 2004080447 A | 3/2004 |
| JP | 2009130529 A | 6/2009 |
| JP | 2011205441 A | 10/2011 |
| JP | 2012253617 A | 12/2012 |
| JP | 2013004027 A | 1/2013 |
| JP | 2014501049 A | 1/2014 |
| JP | 2014130517 A | 7/2014 |
| JP | 2015056904 A | 3/2015 |
| KR | 20050108869 A | 11/2005 |
| WO | 2010021057 A1 | 2/2010 |

OTHER PUBLICATIONS

The Japan Patent Office (JPO) Notification of Reasons for Refusal for Application No. 2017-549618 dated Jun. 26, 2018 9 Pages (including translation).
The State Intellectual Property Office of the People's Republic of China (SIPO) Office Action 1 for 201510208966.9 dated Aug. 17, 2017 11 Pages (including translation).

* cited by examiner

INTERACTION METHOD AND SYSTEM BASED ON RECOMMENDED CONTENT

CROSS REFERENCES TO RELATED APPLICATION

This application claims priority to PCT Patent Application No. PCT/CN2016/080554, filed on Apr. 28, 2016, which claims priority to Chinese Patent Application No. 201510208966.9, filed on Apr. 28, 2015, and entitled "INTERACTION METHOD AND APPARATUS BASED ON RECOMMENDED CONTENT," all of which is incorporated herein by reference in their entirety.

FIELD OF THE TECHNOLOGY

The present disclosure generally relates to the field of network technologies, and in particular, to interaction method and system based on recommended content.

BACKGROUND OF THE DISCLOSURE

With development of network technologies, network videos are increasingly widely applied in daily life, and video playback applications can be installed on many terminals, to provide a network video playback function to users. As audiences of the network videos increase, many producers insert recommended content into the beginning, the middle, or other positions of the network videos to promote their products. The recommended content may include product-related advertisements, activity information, or the like. In a process of playing a network video by a terminal, the terminal directly presents inserted recommended content for a user to watch the recommended content.

Problems arise, however, as the user has to watch the recommended content without any other options. This easily results in frown of the user, reduces user viscosity, and also reduces a conversion rate of the recommended content.

SUMMARY

Embodiments of the present disclosure provide an interaction method and an interaction system, based on recommended content. The interaction system may include a terminal and/or a server.

According to one aspect, an interaction method based on recommended content is provided, the method including: receiving a playback instruction for a multimedia file, and obtaining recommended content corresponding to the multimedia file; presenting, on a playback interface, the recommended content at a designated playback time point of the multimedia file; displaying an interaction option of the recommended content on the playback interface; and interacting with the recommended content based on the interaction option, after detecting a selection operation on the interaction option.

According to another aspect, an interaction method based on recommended content is provided, the method including: receiving a recommended-content obtaining request of a terminal with respect to a multimedia file, the recommended-content obtaining request being used for requesting for recommended content corresponding to the multimedia file; sending the recommended content corresponding to the multimedia file to the terminal, the terminal being configured to: present the recommended content on a playback interface at a designated playback time point of the multimedia file and display an interaction option of the recommended content on the playback interface; receiving an interaction request sent by the terminal, the interaction request being triggered by a selection operation on the interaction option; and performing interactive processing on the recommended content according to the interaction request.

According to another aspect, a system is provided and includes a terminal, the terminal including: one or more processors, and a memory, and the memory storing one or more programs, the one or more programs being executed by the one or more processors, and the one or more programs including instructions for performing an interaction method based on recommended content, the method comprising: receiving a playback instruction for a multimedia file; obtaining recommended content corresponding to the multimedia file; presenting, on a playback interface, the recommended content at a designated playback time point of the multimedia file; displaying an interaction option of the recommended content on the playback interface; and interacting with the recommended content based on the interaction option, after detecting a selection operation on the interaction option.

The technical solutions provided in the embodiments of the present disclosure have the following beneficial effects.

According to the method, the system, the terminal, and the server that are provided in the embodiments of the present disclosure, recommended content is presented at a designated playback time point of a multimedia file, and an interaction option of the recommended content is displayed, so that a user may trigger a selection operation on the interaction option to interact with the recommended content, rather than passively watching the recommended content. This provides the user with a method for interacting with the recommended content, increases flexibility, enhances attractiveness of the recommended content to the user, increases user viscosity, and increases a conversion rate of the recommended content.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

As used herein, unless otherwise specified, the term "recommended content" refers to content inserted into a multimedia file, and the recommended content may be played when the multimedia file is being played. The recommended content may be presented before the multimedia file is played, or may be presented in a process of playing the multimedia file, or may be presented after the multimedia file has been played for a period of time, or may be presented after playing of the multimedia file ends.

Compared with duration for playing the multimedia file, the recommended content may be played for a very short duration. The recommended content may be an advertisement, news, activity information, or the like. Usually, the recommended content may be irrelevant to content of the multimedia file. Presentation of the recommended content in a process of playing the multimedia file may result in frown of a user. Therefore, the present disclosure provides, by using one or more of the following embodiments, the user with a method and system for interacting with the recommended content, to enhance attractiveness of the recommended content to the user.

Figure 1:
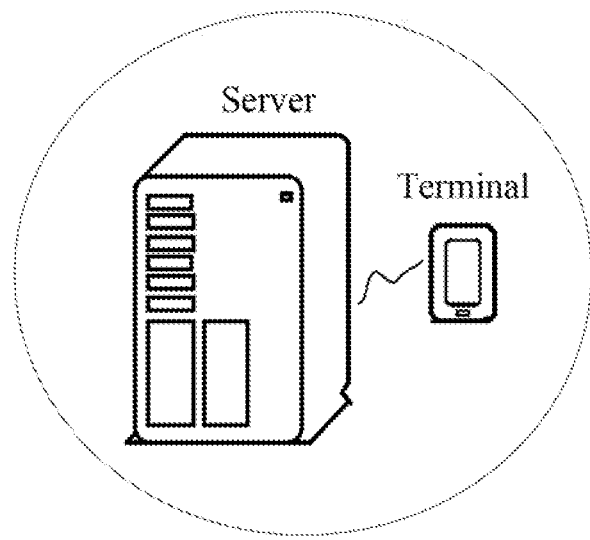
FIG. 1 is a schematic structural diagram of an implementation environment according to an embodiment of the present disclosure.

FIG. 1 is a schematic structural diagram of an implementation environment according to an embodiment of the present disclosure. The implementation environment includes a system including a terminal and a server, and the terminal and the server are connected through a network.

The server is configured to provide a multimedia file and recommended content corresponding to the multimedia file to the terminal. The terminal is configured to play the multimedia file when receiving a playback instruction for the multimedia file, and present the corresponding recommended content at a designated playback time point when playing the multimedia file. The terminal is further configured to: display an interaction option of the recommended content, and to interact with the recommended content based on the interaction option, after detecting a selection operation on the interaction option.

Figure 2:
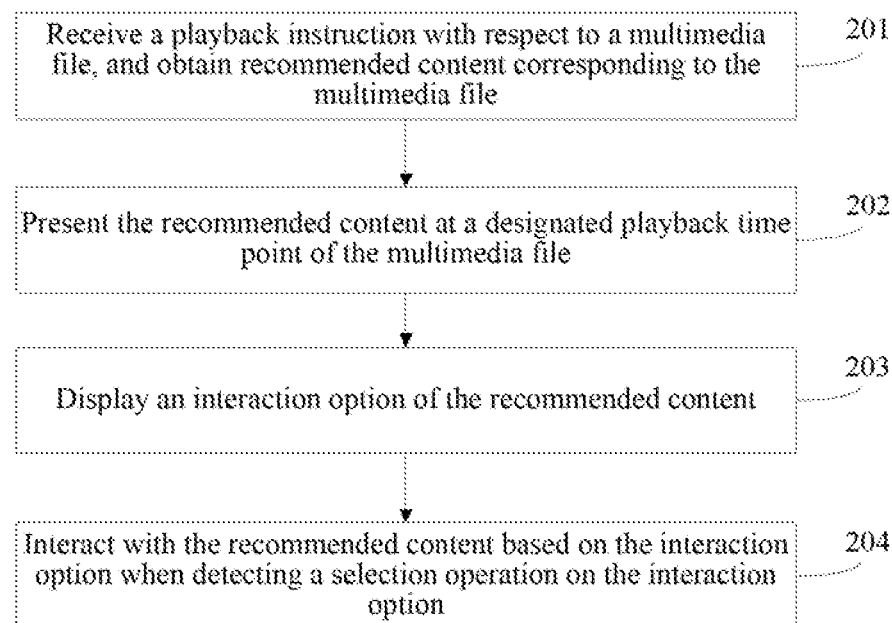
FIG. 2 is a flowchart of an interaction method based on recommended content according to an embodiment of the present disclosure.

FIG. 2 is a flowchart of an interaction method based on recommended content according to an embodiment of the present disclosure. The embodiment of the disclosure is executed by a terminal. Referring to FIG. 2, the method includes:

201: Receiving a playback instruction for a multimedia file, and obtaining recommended content corresponding to the multimedia file.

202: Presenting the recommended content at a designated playback time point of the multimedia file on a playback interface.

203: Displaying an interaction option of the recommended content on the playback interface.

204: Interacting with the recommended content based on the interaction option, after detecting a selection operation on the interaction option.

According to the method provided in this embodiment of the present disclosure, recommended content is presented at a designated playback time point of a multimedia file, and an interaction option of the recommended content is displayed, so that a user may trigger a selection operation on the interaction option to interact with the recommended content, rather than watching the recommended content passively, which provides the user with a method for interacting with the recommended content, increases flexibility, enhances attractiveness of the recommended content to the user, increases user viscosity, and increases a conversion rate of the recommended content.

Optionally, before the presenting the recommended content at a designated playback time point of the multimedia file, the method further includes: receiving the designated playback time point sent by a server; or obtaining the stored designated playback time point.

Optionally, before the displaying an interaction option of the recommended content, the method further includes: presenting the recommended content, after detecting a playback pause operation on the multimedia file in a process of playing the multimedia file.

Optionally, the displaying an interaction option of the recommended content includes: displaying the interaction option of the recommended content in a process of presenting the recommended content; or displaying the interaction option of the recommended content in a process of playing the multimedia file.

Optionally, the interaction option includes an evaluation option, and the method further includes: displaying a first quantity of times of evaluation of the recommended content in a designated display area of the evaluation option when displaying the evaluation option.

Optionally, before the displaying a first quantity of times of evaluation of the recommended content, the method further includes: receiving the first quantity of times of evaluation, sent by the server, of the recommended content.

Optionally, the interacting with the recommended content based on the interaction option, after detecting a selection operation on the interaction option includes: presenting the evaluation option according to a first animation effect when a selection operation on the evaluation option is detected for the first time; adjusting a quantity of times of evaluation of the recommended content to a second quantity of times of evaluation; and displaying the second quantity of times of evaluation in the designated display area.

Optionally, the interacting with the recommended content based on the interaction option, after detecting a selection operation on the interaction option further includes: presenting the evaluation option according to a second animation effect when the selection operation on the evaluation option is detected again; restoring the quantity of times of evaluation of the recommended content to the first quantity of times of evaluation and displaying the first quantity of times of evaluation in the designated display area.

Optionally, the method further includes: sending an evaluation request to the server when the displaying of the evaluation option ends and a current quantity of times of evaluation of the recommended content is not the first quantity of times of evaluation, where the evaluation request carries a content identifier of the recommended content, and the server is configured to adjust a recorded quantity of times of evaluation of the recommended content according to the evaluation request.

Optionally, the interaction option includes a sharing option, and the interacting with the recommended content based on the interaction option, after detecting a selection operation on the interaction option includes: sending a sharing request to a server, after detecting a selection operation on the sharing option, where the sharing request carries a content identifier of the recommended content and a current login user identifier, and the server is configured to share the recommended content to a dynamic-information presentation page of the user identifier according to the content identifier.

Optionally, the sending a sharing request to a server, after detecting a selection operation on the sharing option includes: obtaining the content identifier of the recommended content and the user identifier, after detecting the selection operation on the sharing option; displaying a sharing interface of the recommended content, where the sharing interface is used by a user to confirm the sharing of the recommended content; and sending the sharing request to the server, after detecting a continuation operation in the sharing interface.

Optionally, the sending a sharing request to a server, after detecting a selection operation on the sharing option includes: obtaining the content identifier of the recommended content, after detecting the selection operation on the sharing option; displaying icons of multiple information presentation applications; determining, from the icons of the multiple information presentation applications, a designated information presentation application corresponding to a selected icon; enabling the designated information presentation application; and sending the sharing request to a server of the designated information presentation application based on a designated user identifier for logging in to the designated information presentation application, where the sharing request carries the content identifier.

All the foregoing optional technical solutions may be combined in any manner to form optional embodiments of the present disclosure, and details are not described herein.

Figure 3:
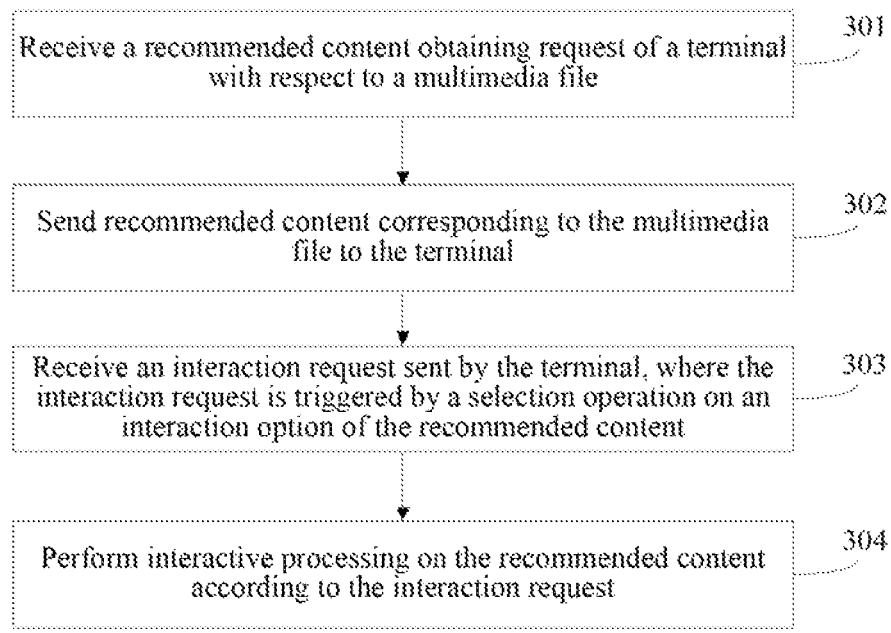
FIG. 3 is a flowchart of an interaction method based on recommended content according to an embodiment of the present disclosure.

FIG. 3 is a flowchart of an interaction method based on recommended content according to an embodiment of the present disclosure. The embodiment of the disclosure is executed by a server. Referring to FIG. 3, the method includes:

301: Receiving a recommended-content obtaining request of a terminal with respect to a multimedia file, where the recommended-content obtaining request is used for requesting for recommended content corresponding to the multimedia file.

302: Sending the recommended content corresponding to the multimedia file to the terminal, where the terminal is configured to: present the recommended content at a designated playback time point of the multimedia file and display an interaction option of the recommended content.

303: Receiving an interaction request sent by the terminal, where the interaction request is triggered by a selection operation on the interaction option of the recommended content.

304: Performing interactive processing on the recommended content according to the interaction request.

According to the method provided in this embodiment of the present disclosure, a terminal displays recommended content at a designated playback time point of a multimedia file, and displays an interaction option of the recommended content. An interaction request is triggered according to a selection operation of a user on the interaction option of the recommended content. A server receives the interaction request, and performs interactive processing on the recommended content. By means of the technical solution of the present disclosure, the user may trigger, on the terminal, the selection operation on the interaction option to interact with the commended content, rather than watching the recommended content passively, which provides the user with a method for interacting with the recommended content, increases flexibility, enhances attractiveness of the recommended content to the user, increases user viscosity, and increases a conversion rate of the recommended content.

Optionally, the performing interactive processing on the recommended content according to the interaction request includes: adjusting, when the interaction request is an evaluation request, a recorded quantity of times of evaluation of the recommended content according to the evaluation request.

Optionally, the performing interactive processing on the recommended content according to the interaction request includes: obtaining a current login user identifier of the terminal when the interaction request is a sharing request; and sharing the recommended content to a dynamic-information presentation page of the user identifier.

Optionally, before the sending the recommended content corresponding to the multimedia file to the terminal, the method further includes: obtaining the recommended content, where an attribute of the recommended content is the same as an attribute of recommended content that has been recommended by the terminal or recommended content that has been shared by the terminal.

Optionally, before the sending the recommended content corresponding to the multimedia file to the terminal, the method further includes: determining a popular recommended content set according to a quantity of times of evaluation and a quantity of times of sharing by the terminal in each recommended content set; and the sending the recommended content corresponding to the multimedia file to the terminal includes: sending recommended content that is in the popular recommended content set and that has not been played on the terminal to the terminal.

All the foregoing optional technical solutions may be combined in any manner to form optional embodiments of the present disclosure, and details are not described herein.

Figure 4A:
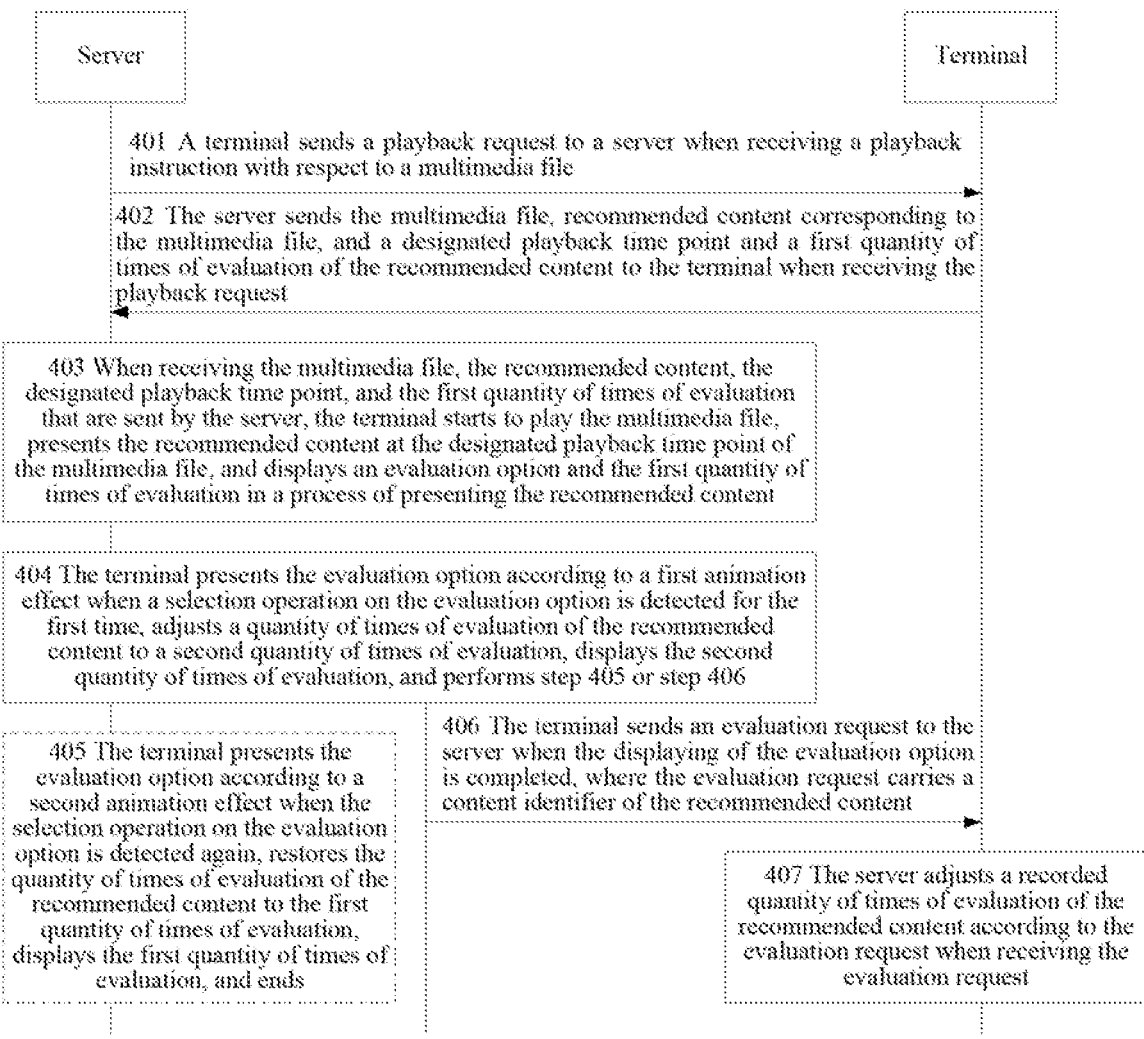
FIG. 4A is a flowchart of an interaction method based on recommended content according to an embodiment of the present disclosure.

FIG. 4A is a flowchart of an interaction method based on recommended content according to an embodiment of the present disclosure. In this embodiment of the disclosure, interaction is performed between a terminal and a server. In this embodiment of the present disclosure, an interaction process based on recommended content is described by using an example in which an interaction option is an evaluation option. Referring to FIG. 4A, the method includes:

401: The terminal sends a playback rescues to the server when receiving a playback instruction for a multimedia file.

Optionally, the playback instruction may carry a file identifier of the multimedia file, and the playback request sent to the server may also carry the file identifier, so that the server obtains the multimedia file according to the file identifier.

402: The server sends the multimedia file, recommended content corresponding to the multimedia file, and a designated playback time point and a first quantity of times of evaluation of the recommended content to the terminal when receiving the playback request.

To play the multimedia file online, the terminal sends the playback request to the server when receiving the playback instruction, to request the server to return the multimedia file. The server sends the multimedia file, the recommended content corresponding to the multimedia file, and the designated playback time point and the first quantity of times of evaluation of the recommended content to the terminal when receiving the playback request.

In this embodiment of the present disclosure, that the terminal plays the multimedia file online is only used as an example for description. When the multimedia file is to be played online, the terminal sends the playback request to the server when receiving the playback instruction. However, in an actual application, this embodiment of the present disclosure may also be applied to a scenario in which the terminal plays a local multimedia file. For example, the terminal may also download the multimedia file from the server in advance, and the terminal sends a recommended-content obtaining request to the server when playing the multimedia file. The recommended-content obtaining request is used for requesting for the recommended content corresponding to the multimedia file.

Optionally, a specific implementation process of the foregoing described example in which the terminal plays a local multimedia file may be: The terminal sends a download request to the server, and downloads the multimedia file from the server. Subsequently, the terminal obtains the downloaded multimedia file when receiving the playback instruction, and sends the recommended-content obtaining request to the server, to request the server to return the recommended content corresponding to the multimedia file and the designated playback time point.

In the scenario in which the terminal plays a local multimedia file, in addition to the foregoing described implementation manner, another implementation manner may also be used. For example, the terminal sends a download request to the server. When the server receives the download request, it is default that the server receives the recommended-content obtaining request. Therefore, the server sends the multimedia file, the recommended content corresponding to the multimedia file, and the designated playback time point to the terminal, that is, the terminal may simultaneously download the multimedia file, the recommended content corresponding to the multimedia file, and the designated playback time point. Subsequently, the terminal obtains the downloaded multimedia file, the downloaded recommended content, and the downloaded designated playback time point when receiving the playback instruction for the multimedia file.

Optionally, in the scenario in which the terminal plays the multimedia file online or the scenario in which the terminal plays a local multimedia file, the playback instruction sent by the terminal to the server carries a the identifier of the multimedia file, and the recommended-content obtaining request sent to the server carries the file identifier of the multimedia file or the download request sent to the server also carries the file identifier of the multimedia file.

When receiving the playback request, the server obtains the multimedia file and a content identifier of the recommended content corresponding to the multimedia file from a correspondence between file identifiers, content identifiers, and multimedia files according to the file identifier that is carried in the playback request and that is of the multimedia file, further obtains the recommended content, and the designated playback time point and the first quantity of times of evaluation of the recommended content from a correspondence between the content identifiers, recommended content, designated playback time points, and quantities of times of evaluation according to the content identifier, and then sends the multimedia file the recommended content corresponding to the multimedia file, and the designated playback time point and the first quantity of times of evaluation of the recommended content to the terminal; or when receiving the recommended-content obtaining request, the server obtains a content identifier of the recommended content corresponding to the multimedia file from a correspondence between file identifiers, content identifiers, and multimedia files according to the file identifier that is carried in the recommended-content obtaining request and that is of the multimedia file, further obtains the recommended content, and the designated playback time point and the first quantity of times of evaluation of the recommended content from a correspondence between the content identifiers, recommended content, designated playback time points, and quantities of times of evaluation according to the content identifier, and then sends the recommended content and the designated playback time point and the first quantity of times of evaluation of the recommended content to the terminal; or when the server receives the download request and it is default that the server receives the recommended-content obtaining request, the server obtains the multimedia file and a content identifier of the recommended content corresponding to the multimedia file from a correspondence between file identifiers, content identifiers, and multimedia files according to the file identifier that is carried in the download request and that is of the multimedia file, further obtains the recommended content and the designated playback time point and the first quantity of times of evaluation of the recommended content from a correspondence between the content identifiers, recommended content, designated playback time points, and quantities of times of evaluation according to the content identifier, and then sends the multimedia file, the recommended content corresponding to the multimedia file, and the designated playback time point and the first quantity of times of evaluation of the recommended content to the terminal.

Optionally, the server may pre-store the correspondence between the file identifiers, the content identifiers, and the multimedia files, and the correspondence between the content identifiers, the recommended content, the designated playback time points, and the quantities of times of evaluation. For any record in the correspondence between the file identifiers, the content identifiers, and the multimedia files, a file identifier in the record is used for identifying a multimedia file in the record, and a content identifier in the record is used for identifying recommended content corresponding to the multimedia file. For any record in the correspondence between the content identifiers, the recommended content, the designated playback time points, and the quantities of times of evaluation, a quantity of times of evaluation in the record is a current total quantity of times of evaluation of recommended content in the record.

In view of content, the recommended content corresponding to the multimedia file may include content such as an advertisement or news. In view of a format, the recommended content may include a recommended video, recommended audio, a recommended image, a recommended text, or the like. No limitation is imposed herein in this embodiment of the present disclosure. The designated playback time point of the recommended content is used for representing a playback time point of the recommended content in the multimedia file, and may be sent by the server to the terminal.

The recommended content corresponding to the multimedia file and the designated playback time point both may be predetermined by the server. The server may negotiate with producers of recommended content to determine recommended content corresponding to each multimedia file, and a designated playback time point of each piece of recommended content in the multimedia file. Optionally, after negotiating each multimedia file, the server may store a file identifier of the multimedia file, a content identifier of the recommended content corresponding to the multimedia file, and the multimedia file in the correspondence between the file identifiers, the content identifiers, and the multimedia files; set an initial value of a quantity of times of evaluation of the recommended content, where the initial value of the quantity of times of evaluation may be zero; and store the content identifier of the recommended content, the recommended content, the designated playback time point of the recommended content, and the initial value of the quantity of times of evaluation in the correspondence between the content identifiers, the recommended content, the designated playback time points, and the quantities of times of evaluation.

In addition, during an application, the server may further replace and update the recommended content corresponding to the multimedia file, or adjust the designated playback time point of the recommended content. No limitation is imposed herein in this embodiment of the present disclosure. Optionally, when the recommended content corresponding to the multimedia file needs to be replaced and updated, the server obtains the corresponding content identifier from the correspondence between the file identifiers, the content identifiers, and the multimedia files according to the file identifier of the multimedia file, and updates the obtained content identifier to a content identifier of new recommended content. When the designated playback time point of the recommended content needs to be adjusted, the server obtains the designated playback time point of the recommended content from the correspondence between the content identifiers, the recommended content, the designated playback time points, and the quantities of times of evaluation according to the content identifier of the recommended content, and updates the designated playback time point of the recommended content to a designated playback time point to be adjusted.

In addition, the designated playback time point may also be predetermined by and stored in the terminal, and the pre-stored designated playback time point is obtained when the playback instruction for the multimedia file is received. Alternatively, the designated playback time point may also refer to a time point at which the user triggers a pause operation on the multimedia file, that is, a time point at which the terminal detects the pause operation on the multimedia file in the process in which the terminal plays the multimedia file. No limitation is imposed herein in this embodiment of the present disclosure.

Optionally, the designated playback time point may represent a time point at which the recommended content starts to be played in the multimedia file. When the playing of the multimedia file reaches the designated playback time point, the recommended content starts to be presented. For example, recommended text or a recommended image starts to be displayed.

If the recommended content is a recommended video or recommended audio, when the playing of the multimedia file reaches the designated playback time point, the playing of the multimedia file is paused, and the recommended content starts to be played. The multimedia file continues to be played when the playing of the recommended content is completed. If the designated playback time point of the recommended content is $00^{th}$ minutes $00^{th}$ seconds, the recommended content is first played before the multimedia file is played, and the multimedia file is then played after the playing of the recommended content is completed. Alternatively, the designated playback time point of the recommended content is $30^{th}$ minutes $00^{th}$ seconds. When playback duration of the multimedia file reaches 30 minutes 00 seconds, the playing of the multimedia file is paused, and the recommended content starts to be played. The multimedia file then continues to be played after the playing of the recommended content is completed.

The multimedia file may correspond to one piece of recommended content and a designated playback time point of the recommended content, or may correspond to multiple pieces of recommended content and designated playback time points of the multiple pieces of recommended content. For example, the terminal may obtain a recommended content list corresponding to the multimedia file, where the recommended content list includes multiple pieces of ordered recommended content. The terminal may determine a designated playback time point of fist recommended content in the recommended content list, and sequentially present the multiple pieces of recommended content in an order in the recommended content list when the playing of the multimedia file reaches the designated playback time point.

To enhance interaction with the user during the playing of the recommended content, the terminal may display an interaction option of the recommended content. In this embodiment of the present disclosure, that the interaction option is an evaluation option is used as an example for description. To present evaluation of the recommended content to the user, the server may collect statistics about quantities of times of evaluation of the recommended content of multiple users, and send a current quantity of times of evaluation, that is, the first quantity of times of evaluation, of the recommended content to the terminal.

The server may collect statistics about the quantity of times of evaluation of the recommended content according to evaluation requests of multiple terminals with respect to the recommended content, correspondingly record the content identifier of the recommended content and the quantity of times of evaluation, and increase the recorded quantity of times of evaluation corresponding to the content identifier by 1 when an evaluation request of any terminal with respect to the recommended content is received subsequently. The content identifier is used for uniquely determining the recommended content, and may be a name, a number, or the like of the recommended content. No limitation is imposed herein in this embodiment of the present disclosure.

Certainly, the server may not send the quantity of times of evaluation of the recommended content to the terminal, and the terminal displays only the evaluation option but not the quantity of times of evaluation of the recommended content.

403: When receiving the multimedia file, the recommended content, the designated playback time point, and the first quantity of times of evaluation that are sent by the server, the terminal starts to play the multimedia file, presents the recommended content at the designated playback time point of the multimedia file, and displays an evaluation option and the first quantity of times of evaluation in a process of presenting the recommended content.

The terminal plays the multimedia file according to the playback instruction, and starts to present the recommended content when the playing of the multimedia file reaches the designated playback time point. The terminal displays the evaluation option in the process of presenting the recommended content. The evaluation option may be used for evaluating the recommended content, and may include at least one of a Like evaluation option or an Unlike evaluation option. The user may select the Like evaluation option when the user is interested in the recommended content, and the user may select the Unlike evaluation option when the user is not interested in the recommended content.

The terminal may display, when obtaining the first quantity of times of evaluation sent by the terminal, the first quantity of times of evaluation to indicate current evaluation of the recommended content by other users. In addition, the terminal may not display the first quantity of times of evaluation when the first quantity of times of evaluation is zero.

Figure 4B:
FIG. 4B is a schematic diagram of a display of an evaluation option according to an embodiment of the present disclosure.

Further, the terminal may display the first quantity of times of evaluation in a designated display area corresponding to the evaluation option. The designated display area may be above or below the evaluation option, and no limitation is imposed herein in this embodiment of the present disclosure. Referring to FIG. 4B, the terminal displays the evaluation option on a left side of a playback interface of the recommended content, and displays the current quantity of times of evaluation "3852445" below the evaluation option.

In addition, when a value of the first quantity of times of evaluation is excessively large, the terminal may display the first quantity of times of evaluation in a simplified form of the first quantity of times of evaluation, to avoid occupation of an excessively large display area. For example, when the first quantity of times of evaluation is 2489, the terminal may display "2489", and when the first quantity of times of evaluation is 1035333, the terminal may display "one million+". The simplified form of the first quantity of times of evaluation is not limited in this embodiment of the present disclosure.

The terminal may display the evaluation option and the first quantity of times of evaluation when the terminal starts to present the recommended content. When the presentation of the recommended content is completed and the terminal starts to present a next recommended content, the evaluation option and the first quantity of times of evaluation that are initially displayed are cancelled, and the terminal displays an evaluation option and a first quantity of times of evaluation of the next recommended content.

However, when the user clicks the evaluation option of the recommended content, if the terminal switches the recommended content to the next recommended content, the user probably performs a mis-operation, and clicks the evaluation option of the next recommended content. To avoid a mis-operation, for each recommended content, the terminal may not immediately display the evaluation option and the first quantity of times of evaluation when the terminal starts to present the recommended content, but to start to display the evaluation option and the first quantity of times of evaluation after the recommended content has been displayed for preset duration, and to stop displaying the evaluation option and the first quantity of times of evaluation when the presentation of the recommended content is completed. That the presentation of the recommended content is completed indicates an ending of the presentation of the recommended content. Moreover, the next recommended content starts to be presented after the presentation of the recommended content ends, and the evaluation option and the first quantity of times of evaluation of the next recommended content start to be displayed after the next recommended content has been presented for preset duration. In this way, the evaluation option of the next recommended content is not displayed within the preset duration of the presentation of the next recommended content, which prevents the user from a mis-operation. The preset duration may be five seconds or other duration, and no limitation is imposed herein in this embodiment of the present disclosure.

It should be noted that in this embodiment of the present disclosure, that the evaluation option and the first quantity of times of evaluation are displayed in the process of presenting the recommended content is only used as an example for description. Actually, the evaluation option and the quantity of times of evaluation of the recommended content may be displayed before or after the terminal presents the recommended content. For example, the terminal may keep displaying the evaluation option and the quantity of times of evaluation of the recommended content in the process of playing the multimedia file. In this case, the terminal may display a prompt information, and the prompt information includes an introduction of the recommended content, to inform the user that the evaluation option and the quantity of times of evaluation that are currently displayed correspond to the recommended content. No limitation is imposed herein in this embodiment of the present disclosure.

404: The terminal presents the evaluation option according to a first animation effect when a selection operation on the evaluation option is detected for the first time, adjusts a quantity of times of evaluation of the recommended content to a second quantity of times of evaluation, displays the second quantity of times of evaluation, and performs step 405 or step 406.

The user of the terminal may trigger the selection operation on the evaluation option, to evaluate the recommended content. The selection operation on the evaluation option may be a single-click operation, a touch and hold operation, or the like, and no limitation is imposed herein in this embodiment of the present disclosure.

The terminal may adjust the quantity of times of evaluation of the recommended content to the second quantity of times of evaluation when the selection operation on the evaluation option is detected for the first time, cancel the displaying of the first quantity of times of evaluation in the designated display area, and display the second quantity of times of evaluation in the designated display area. Optionally, the terminal increases the current first quantity of times of evaluation of the recommended content by 1 when the selection operation on the evaluation option is detected for the first time, to obtain the second quantity of times of evaluation, and displays the second quantity of times of evaluation in the designated display area.

Further, the terminal may also present the evaluation option according to the first animation effect when the selection operation on the evaluation option is detected for the first time. The first animation effect may be used for changing a color of the evaluation option, changing a shape of the evaluation option, and so on, and no limitation is imposed herein in this embodiment of the present disclosure.

Figure 4C:
FIG. 4C is a schematic diagram of a display of another evaluation option according to an embodiment of the present disclosure.

Referring to FIG. 4B, the terminal displays a grey heart-shaped evaluation option in the playback interface of the recommended content. When the selection operation on the evaluation option is detected for the first time, the evaluation option is dynamically enlarged and gradually becomes yellow. Moreover, the quantity of times of evaluation of the recommended content is adjusted from "3852445" to "3852446", and the quantity of time of evaluation "3852446" is displayed in the designated display area, as shown in FIG. 4C.

405: The terminal presents the evaluation option according to a second animation effect when the selection operation on the evaluation option is detected again, restores the quantity of times of evaluation of the recommended content to the first quantity of times of evaluation, displays the first quantity of times of evaluation, and ends.

After the selection operation on the evaluation option is triggered, when the user wants to cancel the evaluation on the recommended content, the user may trigger the selection operation on the evaluation option again. The terminal detects the selection operation on the evaluation option again. In this case, the terminal restores the quantity of times of evaluation of the recommended content to the first quantity of times of evaluation, cancels the displaying of the second quantity of times of evaluation in the designated display area, and displays the first quantity of times of evaluation in the designated display area again.

Further, the terminal may also present the evaluation option according to the second animation effect when the selection operation on the evaluation option is detected again. The second animation effect may be used for changing a color of the evaluation option, changing a shape of the evaluation option, and so on. Optionally, the second animation effect and the first animation effect are reverse animation effects. For example, when the first animation effect is changing from blue to red, the second animation effect is changing from red to blue. After the terminal presents the evaluation option according to the first animation effect, the presented evaluation option is the same as the evaluation option initially presented by the terminal when the terminal then presents the evaluation option according to the second animation effect.

Referring to FIG. 4B, when the terminal detects the selection operation on the evaluation option for the first time, the evaluation option is dynamically enlarged and gradually becomes yellow from grey, as shown in FIG. 4C. When the terminal detects the selection operation on the evaluation option again, the evaluation option is dynamically reduced to an original size and gradually becomes grey. The displayed evaluation option is shown in FIG. 4B.

In a process in which the terminal displays the evaluation option, the user may trigger the selection operation on the evaluation option multiple times, and the quantity of times of evaluation of the recommended content is adjusted between the first quantity of times of evaluation and the second quantity of times of evaluation. If a quantity of times of triggering on the selection operation is an odd number, the current quantity of times of evaluation of the recommended content is the second quantity of times of evaluation, and if the quantity of times of triggering on the selection operation is an even number, the current quantity of times of evaluation of the recommended content is the first quantity of tunes of evaluation.

It should be noted that the quantity of times of evaluation displayed on the terminal is adjusted only according to the selection operation of the user of the terminal on the evaluation option. In this period, the terminal neither immediately sends the adjusted quantity of times of evaluation to the server, nor receives a quantity of times of evaluation, sent by the server, of the recommended content. The quantity of times of evaluation is not affected by another user.

The terminal sends an evaluation request to the server when the displaying of the evaluation option is completed, where the evaluation request carries a content identifier of the recommended content.

The displaying of the evaluation option is completed, that is, the terminal ends the displaying of the evaluation option.

407: The server adjusts a recorded quantity of times of evaluation of the recommended content according to the evaluation request when receiving the evaluation request.

When the terminal detects the selection operation on the evaluation option for the first time, the user may subsequently cancel evaluation on the recommended content. Therefore, the terminal does not immediately send the evaluation request to the server, but to send or not send the evaluation request to the server according to evaluation by the user on the recommended content when the displaying of the evaluation option is completed.

If the user triggers the selection operation on the evaluation option for only once in the process of displaying the evaluation option, that is, only step 404 is performed and step 405 is not performed, the terminal sends the evaluation request to the server when the displaying of the evaluation option is completed, where the evaluation request carries the content identifier of the recommended content, to indicate that the user has triggered an evaluation operation on the recommended content. The server adjusts the recorded quantity of times of evaluation corresponding to the content identifier when receiving the evaluation request. In a subsequent process, when another terminal presents the recommended content, a quantity of times of evaluation that has been adjusted by the server may be displayed.

Optionally, a detailed process in which the server adjusts the recorded quantity of times of evaluation corresponding to the content identifier may be: The server obtains the corresponding quantity of times of evaluation from the correspondence between the content identifiers, the recommended content, the designated playback time points, and the quantities of times of evaluation according to the content identifier.

In an actual application, when the displaying of the evaluation option is completed, the terminal determines whether the current quantity of times of evaluation of the recommended content is the first quantity of times of evaluation, to determine nether the user triggers the evaluation operation on the recommend content. If the current quantity of times of evaluation of the recommended content is not the first quantity of times of evaluation, it indicates that the users has triggered the evaluation operation on the recommended content, and the evaluation request is sent to the server. However, if the current quantity of times of evaluation of the recommended content still the first quantity of times of evaluation, it indicates that the quantity of times of evaluation of the recommended content stays unchanged, and the user does not trigger the evaluation operation on the recommended content. The terminal does not need to send the evaluation request to the server.

According to the method provided in this embodiment of the present disclosure, an evaluation option on recommended content, so that a user may trigger a selection operation on the evaluation option and evaluate the recommended content, rather than watching the recommended content passively, which provides the user with a method for interacting with the recommended content, increases flexibility, enhances attractiveness of the recommended content to the user, increases user viscosity, and increases a conversion rate of the recommended content.

Figure 5A:
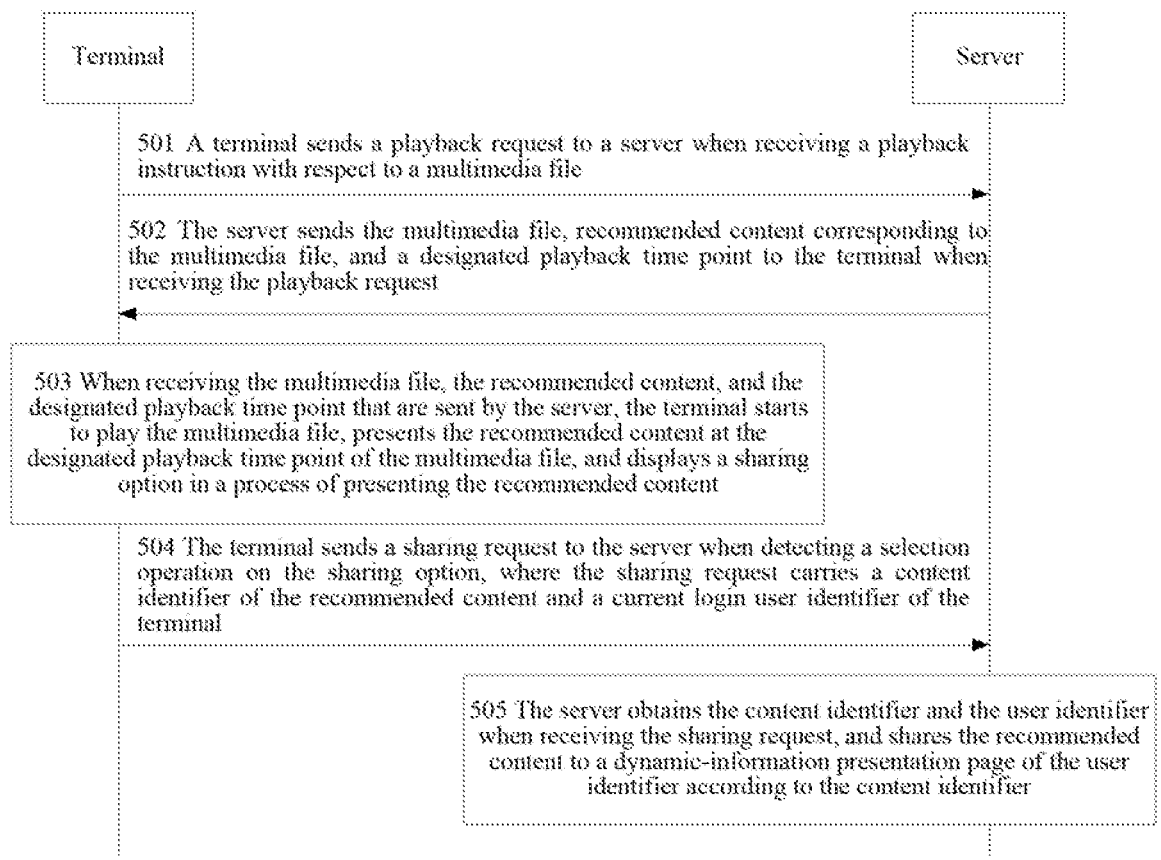
FIG. 5A is a flowchart of an interaction method based on recommended content according to an embodiment of the present disclosure.

FIG. 5A is a flowchart of an interaction method based on recommended content according to an embodiment of the present disclosure. In this embodiment of the disclosure, interaction is performed between a terminal and a server. In this embodiment of the present disclosure, an interaction process based on the recommended content is described by using an example in which an interaction option is a sharing option. Referring to FIG. 5A, the method includes:

501: The terminal sends a playback request to the server when receiving a playback instruction for a multimedia file.

Optionally, the playback instruction may carry a file identifier of the multimedia file, and the playback request sent to the server may also carry the file identifier, so that the server obtains the multimedia file according to the file identifier.

502: The server sends the multimedia file, recommended content corresponding to the multimedia file, and a designated playback time point to the terminal when receiving the playback request.

Step 501 and step 502 are similar to step 401 and step 402. A difference there-between lies in that this embodiment of the present disclosure uses an example in which an interaction option is a sharing option, and does not involve an evaluation option; and the server does not need to send a quantity of times of evaluation of the recommended content to the terminal when receiving the playback request.

503: When receiving the multimedia file, the recommended content, and the designated playback time point that are sent by the server, the terminal starts to play the multimedia file, presents the recommended content at the designated playback time point of the multimedia file, and displays a sharing option in a process of presenting the recommended content.

The step 503 is similar to step 403, and a difference there-between lies in that in this embodiment of the present disclosure, the terminal displays the sharing option. The sharing option may be displayed on a left side or a right side of a playback interface, and no limitation is imposed herein this embodiment of the present disclosure.

Figure 5B:
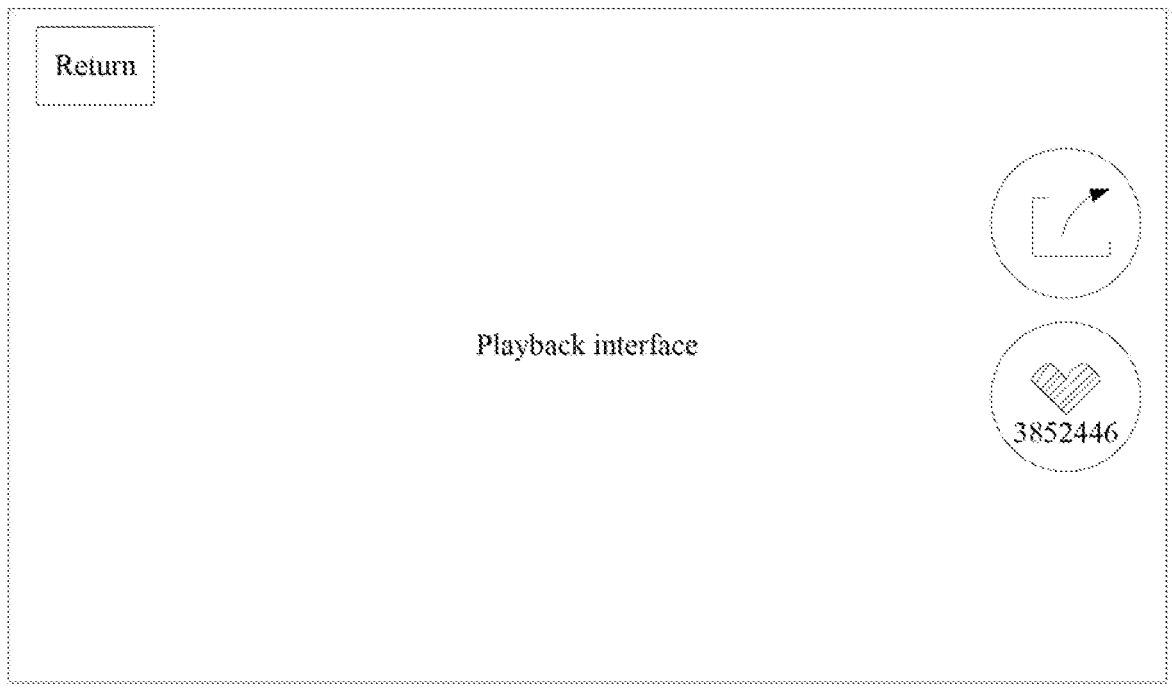
FIG. 5B is a schematic diagram of a display of a sharing option according to an embodiment of the present disclosure.

In another embodiment provided in this embodiment of the present disclosure, the terminal may display the evaluation option and the sharing option in the process of presenting the recommended content. The sharing option may be displayed above or below the evaluation option, and a display position of the recommended content is not limited in this embodiment of the present disclosure. Referring to FIG. 5B, the terminal displays the sharing option on the right side of the playback interface and above the evaluation option.

504: The terminal sends a sharing request to the server, after detecting a selection operation on the sharing option, where the sharing request carries a content identifier of the recommended content and a current login user identifier of the terminal.

In this embodiment of the present disclosure, the terminal logs in to the server based on the user identifier. The server may generate a corresponding dynamic-information presentation page for the user identifier, and the dynamic-information presentation page is used by the terminal to issue dynamic information. The server may further create a corresponding user relationship chain for the user identifier, where the user relationship chain includes multiple user identifiers, and the multiple user identifiers are friends of a user of the terminal. The terminal may issue, based on the user identifier, dynamic information such as individual status information or multimedia file information on the dynamic-information presentation page. The friends of the user of the terminal may visit the dynamic-information presentation page, and browse the dynamic information of the user of the terminal.

When the user wants to share the recommended content with a friend, the user may trigger the selection operation on the sharing option. The selection operation on the sharing option may be a single-click operation, a touch and hold operation, or the like, and no limitation is imposed herein in this embodiment of the present disclosure. The terminal sends the sharing request to the server, after detecting the selection operation on the sharing option, where the sharing request carries the content identifier of the recommended content and the user identifier of the terminal.

Specifically, the terminal obtains the content identifier of the recommended content and the user identifier, after detecting the selection operation on the sharing option, and displays a sharing interface of the recommended content. The sharing interface may include information such as a link address of the recommended content, which is used by the user to confirm the sharing of the recommended content. The terminal sends the sharing request to the server, after detecting a confirmation operation in the sharing interface. Further, the terminal obtains the content identifier of the recommended content and the user identifier, after detecting the selection operation on the sharing option in the process of presenting the recommended content, pauses the presentation of the recommended content, and switches the current playback interface to the sharing interface of the recommended content based on the content identifier of the recommended content and the user identifier. The sharing interface includes the link address of the recommended content and an individual status information input column. The user may input, into the individual status information input column, status information that is to be presented when the recommended content is shared. When the terminal detects the confirmation operation in the sharing interface, it indicates that the user confirms the sharing of the recommended content. Therefore, the terminal sends the sharing request to the server, where the sharing request carries the content identifier of the recommended content, the user identifier, and the status information input by the user into the sharing interface. In this case, the terminal switches the sharing interface to the playback interface, and continues to present the recommended content.

505: The server obtains the content identifier and the user identifier when receiving the sharing request, and shares the recommended content to a dynamic-information presentation page of the user identifier according to the content identifier.

The server obtains the content identifier and the user identifier when receiving the sharing request, and shares the recommended content to the dynamic-information presentation page of the user identifier according to the content identifier, that is, shared dynamic information is issued on the dynamic-information presentation page of the user identifier. The shared dynamic information includes the link address of the recommended content, and if the user already inputs status information that is to be presented when the recommended content is shared, the shared dynamic information further includes the status information input by the user.

Another friend may browse the shared dynamic information, and present the recommended content according to the link address of the recommended content, or perform an operation such as a Like operation, an unlike operation, a comment operation, or a sharing operation on the shared dynamic information. No limitation is imposed herein this embodiment of the present disclosure.

In this embodiment of the present disclosure, that the terminal logs in to the server based on the user identifier, and the server generates the dynamic-information presentation page for the user identifier is only used as an example for description. In an actual application, information presentation applications may be installed on the terminal. An information presentation application server is logged in to by using an information presentation application, and the information presentation application server generates a corresponding dynamic-information presentation page for the user identifier of the terminal by using the information presentation application. The information presentation application may be a microblog application, and the dynamic-information presentation page may be a microblog page; or the information presentation application may be an online community application, and the dynamic-information presentation page may be an online community page. A type of the information presentation application is not limited in this embodiment of the present disclosure.

The terminal may display icons of multiple information presentation applications, after detecting the selection operation on the sharing option. The user selects an information presentation application for sharing the recommended content. The terminal determines the information presentation application selected by the user, enables the information presentation application, obtains a user identifier for logging in to the information presentation application by the terminal, and displays the sharing interface by using the information presentation application. After detecting the confirmation operation by the user in the sharing interface, the terminal sends to the sharing request to a server of the information presentation application. The sharing request carries the content identifier of the recommended content and the user identifier. The server of the information presentation application shares the link address of the recommended content to the dynamic-information presentation page of the user identifier according to the content identifier.

Figure 5C:
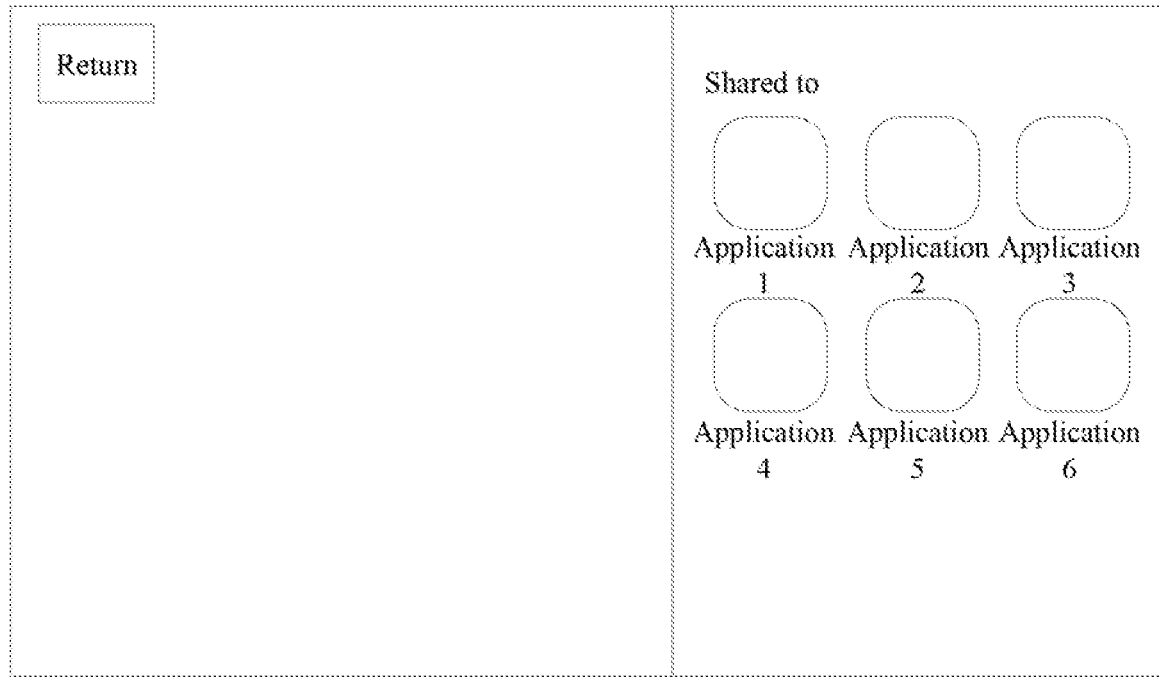
FIG. 5C is a schematic diagram of a display of application icons according to an embodiment of the present disclosure.

Referring to FIG. 5C, the terminal displays the icons of the multiple information presentation applications, after detecting the selection operation on the sharing option. When determining that the user selects an "application 1", the terminal enables the application 1, obtains a user identifier for logging in to the application 1, displays a sharing interface by using the application 1, and sends a sharing request to a server of the application 1, after detecting a confirmation operation by the user in the sharing interface. The sharing request carries the link address of the recommended content and the user identifier. The server of the application 1 shares the link address of the recommended content to a dynamic-information presentation page of the user identifier. Subsequently, the terminal may display the dynamic-information presentation page by using the application 1, to watch the Shared recommended content.

According to the method provided in this embodiment of the present disclosure, a sharing option on recommended content, so that a user may trigger a selection operation on the sharing option and share the recommended content to a dynamic-information presentation page, rather than watching the recommended content passively, which provides the user with a method for interacting with the recommended content, increases flexibility, enhances attractiveness of the recommended content to the user, increases user viscosity, and increases a conversion rate of the recommended content.

Moreover, after the recommended content is shared to the dynamic-information presentation page, friends of the user may perform an operation such as a playback operation, a sharing operation, a comment operation, a Like operation, or an unlike operation an the recommended content, thereby further increasing the conversion rate of the recommended content.

It should be noted that in the foregoing embodiments, the interaction process between the user and the recommended content is described only by using the evaluation option and the sharing option as examples. Actually, the terminal may also display multiple interaction options of the recommended content, for example, a details presentation option or an activity participation option. After detecting a selection operation on any interaction option, the terminal interacts with the recommended content based on the selected interaction option.

In this embodiment of the present disclosure, by displaying an interaction option of the recommended content, interaction is available for the user, and the user is supported to interact with the recommended content such as evaluating the recommended content or sharing the recommended content to a zone page or a microblog page or the like is supported, so that an interaction characteristic of the recommended content is implemented, user experience is improved, and the user is less disgusted.

Optionally, based on the embodiments shown in FIG. 4A and FIG. 5A above, the server may collect statistics about a quantity of times of evaluation and a quantity of times of sharing of each recommended content, and use the quantity of times of evaluation and the quantity of times of sharing as a data source of a survival of the fittest policy for the recommended content, where the quantity of times of evaluation and the quantity of times of sharing indicate popularity of the recommended content, so as to perform screening on multiple pieces of recommended content to choose popular recommended content. Subsequently, the server may play the popular recommended content in the process of playing the multimedia file, and eliminate unpopular recommended content. Optionally, the server may use, recommended content whose either quantity of times of evaluation or quantity of times of sharing exceeds a preset threshold, as the popular recommended content, and use, recommended content whose neither quantity of times of evaluation nor quantity of times of sharing exceeds the preset the threshold, as unpopular recommended content.

For each terminal, the server may collect statistics about recommended content that has been recommended by the terminal and recommended content that has been shared by the terminal, and the recommended content may be considered as recommended content that a user of the terminal is interested in. When the terminal plays a multimedia file subsequently, the server may send, to the terminal, the recommended content that has been recommended by the terminal and the recommended content that has been shared by the terminal, so that the terminal plays, when playing the multimedia file, the recommended content that the user of the terminal is in crested in.

Further, the server may further determine an attribute of each recommended content according to content of each recommended content. The attribute of the recommended content may include multiple types such as a vehicle, clothes, household, music, or milk powder, and no limitation is imposed herein according to various embodiments of the present disclosure.

The server may obtain, according to the attributes of the recommended content, recommended content whose attribute is the same as an attribute of the recommended content that has been recommended by the terminal or the recommended content that has been shared by the terminal. The obtained recommended content may be considered as recommended content that the user of the terminal is probably interested in. The server sends the obtained recommended content to the terminal, so that the terminal presents, when playing the multimedia file, the recommended content sent by the server.

Alternatively, the server may classify recommended content into different recommended content sets according to attributes, and collect statistics about a quantity of times of evaluation and a quantity of times of sharing by the terminal in each recommended content set, so as to determine a popular recommended content set. It play be considered that a user of the terminal is most interested in a video having an attribute of the popular recommended content set. The server sends recommended content that is in the popular recommended content set and that has not been played on the terminal to the terminal, and the terminal plays the recommended content when playing the multimedia file. Optionally, the server may use, a recommended content set whose either quantity of times of evaluation or quantity of times of sharing exceeds a preset threshold, as the popular recommended content set, and use, a recommended content set whose neither quantity of times of evaluation nor quantity of times of sharing exceeds the preset threshold, as unpopular recommended content.

For example, when determining that a quantity of times of evaluation and a quantity of times of sharing by the terminal on recommended content of a milk powder type are highest, the server selects recommended content of a milk powder type that has not been played on the terminal, and the recommended content of the milk powder type to the terminal.

Figure 6:
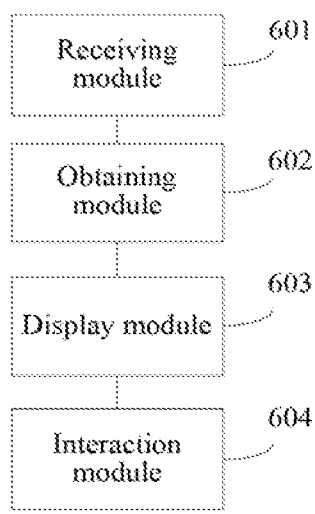
FIG. 6 is a schematic structural diagram of an interaction apparatus based on recommended content according to an embodiment of the present disclosure.

FIG. 6 is a schematic structural diagram of an interaction apparatus based on recommended content according to an embodiment of the present disclosure. Referring to FIG. 6, the apparatus includes: a receiving module 601, configured to receive a playback instruction for a multimedia file; an obtaining module 602, configured to obtain recommended content corresponding to the multimedia file; a display module 603, configured to present the recommended content at a designated playback time point of the multimedia file, where the display module 603 is further configured to display an interaction option of the recommended content; and an interaction module 604, configured to interact, when a selection operation on the interaction option is detected, with the recommended content based on the interaction option.

Optionally, the receiving module 601 is further configured to receive the designated playback time point sent by a server; or the obtaining module 602 is further configured to obtain the stored designated playback time point.

Optionally, the display module 603 is further configured to: present the recommended content when a playback pause operation on the multimedia file is detected in a process of playing the multimedia file.

Optionally, the display module 603 is further configured to display the interaction option of the recommended content in a process of presenting the recommended content; or the display module 603 is further configured to display the interaction option of the recommended content in a process of playing the multimedia file.

Optionally, the interaction option includes an evaluation option; the receiving nodule 601 is further configured to receive a first quantity of times of evaluation, sent by a server, of the recommended content; and the display module 603 is further configured to display the first quantity of times of evaluation in a designated display area of the evaluation option when displaying the evaluation option.

Optionally, the interaction module 604 is further configured to adjust a quantity of times of evaluation of the recommended content to a second quantity of times of evaluation when a selection operation on the evaluation option is detected for the first time; and the display module 603 is further configured to: present the evaluation option according to a first animation effect, and display the second quantity of times of evaluation in the designated display area.

Optionally, the interaction module 604 is further configured to restore the quantity of times of evaluation of the recommended content to the first quantity of times of evaluation when the selection operation on the evaluation option is detected again; and the display module 603 is further configured to: present the evaluation option according to a second animation effect, and display the first quantity of times of evaluation in the designated display area.

Optionally, the apparatus further includes: a determining module, configured to determine: when the displaying of the evaluation option is completed, whether a current quantity of times of evaluation of the recommended content is the first quantity of times of evaluation; and a sending module, configured to send an evaluation request to the server when the current quantity of times of evaluation of the recommended content is not the first quantity of times of evaluation, where the evaluation request carries a content identifier of the recommended content, and the server is configured to adjust a recorded quantity of times of evaluation of the recommended content according to the evaluation request.

Optionally, the interaction option includes a sharing option; the interaction module 604 is further configured to trigger the sending module when a selection operation on the sharing option is detected; and the sending module is configured to send a sharing request to a server, where the sharing request carries a content identifier of the recommended content and a current login user identifier, and the server is configured to share the recommended content to a dynamic-information presentation page of the user identifier according to the content identifier.

Optionally, the interaction module 604 is specifically configured to: when the selection operation on the sharing option is detected, obtain the content identifier of the recommended content and the user identifier, and trigger the display module 603; the display module 603 is further configured to display a sharing interface of the recommended content; and the interaction module 604 is further configured to trigger the sending module when a confirmation operation in the sharing interface is triggered.

Optionally, the interaction module 604 is specifically configured to: when the selection operation on the sharing option is detected, obtain the content identifier of the recommended content, and trigger the display module 603; the display module 603 is further configured to display icons of multiple information presentation applications; the interaction module 604 is further configured to: determine, from the icons of the multiple information presentation applications, a designated information presentation application corresponding to a selected icon, enable the designated information presentation application, and trigger the sending module; and the sending module is further configured to send the sharing request to a server of the designated information presentation application based on a designated user identifier for logging in to the designated information presentation application, where the sharing request carries the content identifier.

All the foregoing optional technical solutions may be combined in any manner to form optional embodiments of the present disclosure, and details are not described herein.

Figure 7:
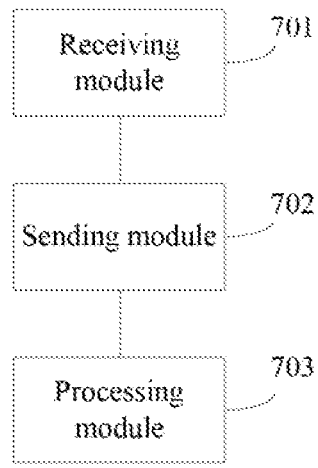
FIG. 7 is a schematic structural diagram of an interaction apparatus based on recommended content according to an embodiment of the present disclosure.

FIG. 7 is a schematic structural diagram of an interaction apparatus based on recommended content according to an embodiment of the present disclosure. Referring to FIG. 7, the apparatus includes: a receiving module 701, configured to receive a recommended content obtaining request of a terminal with respect to a multimedia file, where the recommended content obtaining request is used for requesting for recommended content corresponding to the multimedia file; a sending module 702, configured to send the recommended content corresponding to the multimedia file to the terminal, where the terminal is configured to: present the recommended content at a designated playback time point of the multimedia file and display an interaction option of the recommended content, where the receiving module 701 is further configured to receive an interaction request sent by the terminal, where the interaction request triggered by a selection operation on the interaction option; and a processing module 703, configured to perform interactive processing on the recommended content according to the interaction request.

Optionally, the processing module 703 is further configured to adjust, when the interaction request is an evaluation request, a recorded quantity of times of evaluation of the recommended content according to the evaluation request.

Optionally, the processing module 703 is further configured to: obtain a current login user identifier of the terminal when the interaction request is a sharing request, and share the recommended content to a dynamic-information presentation page of the user identifier.

Optionally, the processing module 703 is further configured to obtain the recommended content, where an attribute of the recommended content is the same as an attribute of recommended content that has been recommended by the terminal or recommended content that has been shared by the terminal.

Optionally, the processing module 703 is further configured to determine a popular recommended content set according to a quantity of times of evaluation and a quantity of times of sharing by the terminal in each recommended content set; and the sending module 702 is configured to send recommended content that is in the popular recommended content set and that has not been played on the terminal to the terminal.

All the foregoing optional technical solutions may be combined in any manner to form optional embodiments of the present disclosure, and details are not described herein.

It should be noted that: during interaction on the basis of recommended content by the interaction apparatus based on recommended content provided in the foregoing embodiment, division of the foregoing function modules is used as an example for description. In an actual application, the foregoing functions can be allocated to and implemented by different function modules and according to a requirement, that is, inner structures of the terminal and the server are divided into different functional modules to implement all or some of the functions described above. In addition, the interaction apparatus based on recommended content and the interaction method based on recommended content that are provided in the foregoing embodiments belong to a same idea. For specific implementation process thereof, refer to the method embodiments. Details are not described herein again.

Figure 8:
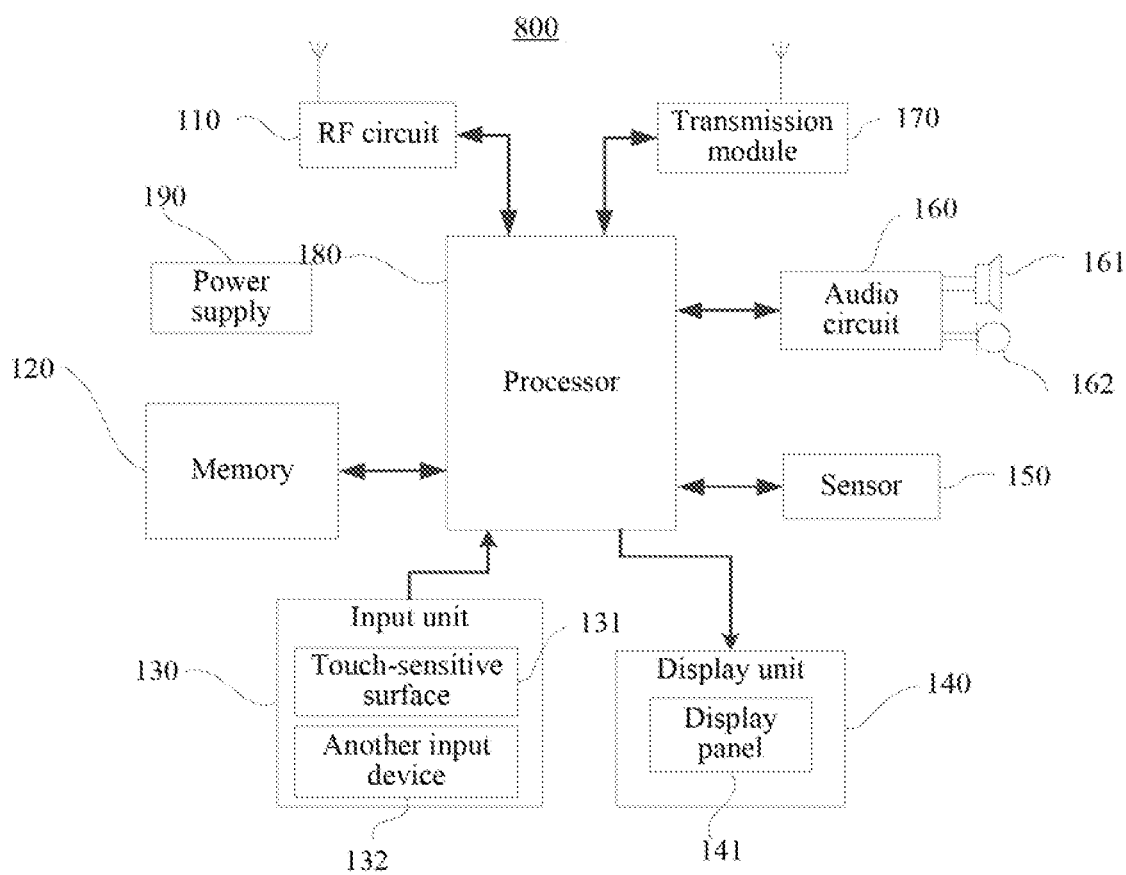
FIG. 8 is a schematic structural diagram of a terminal according to an embodiment of the present disclosure.

FIG. 8 is a schematic structural diagram of a terminal according to an embodiment of the present disclosure. The terminal may be configured to implement functions that are performed by the terminal in the interaction method based on recommended content shown in the foregoing embodiments. Specifically:

The terminal 800 may include components such as a radio frequency (RF) circuit 110, a memory 120 including one or more non-transitory computer readable storage media, an input unit 130, a display unit 140, a sensor 150, an audio frequency circuit 160, a transmission module 170, a processor 180 including one or more processing cores, and a power supply 190. A person skilled in the art may understand that a structure of the terminal shown in FIG. 8 does not constitute a limit to the terminal, and the terminal may include more or fewer components than those shown in the figure, or some components may be combined, or a different component deployment may be used.

The RF circuit 110 may be configured receive and send signals during an information receiving and sending process or a call process, particularly, after receiving downlink information of a base station, deliver the downlink information of the base station to the one or more processors 180 for processing, and in addition, send related uplink data to the base station. Usually, the RF circuit 110 includes, but is not limited to an antenna, at least one amplifier, a tuner, one or more oscillators, a subscriber identity module (SIM) card, a transceiver, a coupler, a low noise amplifier (LNA), a diplexer, and the like. In addition, the RF circuit 110 may be further in communication with a network and another terminal by means of wireless communication. The wireless communication may use any communications standard or protocol, which includes, but is not limited to, Global System for Mobile Communications (GSM), General Packer Radio Service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module, such as a software program and module corresponding to the terminal shown in the foregoing exemplary embodiments. The processor 180 runs the software program and module stored in the memory 120, to implement various functional applications and data processing, for example, video-based interaction. The memory 120 may mainly include a program storage area and a data storage area, where the program storage area may store an operating system, an application program required by at least one function (such as a sound playback function and an image display function), and the like; and the program storage area may store data (such as audio frequency data and an address book) created according to the use of the terminal 800, and the like. In addition, the memory 120 may include a high-speed random access memory (RAM), and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate a keyboard, a mouse, a joystick, or optical or trackball signal input related to a user setting and function control. Specifically, the input unit 130 may include a touch-sensitive surface 131 and another input terminal 132. The touch-sensitive surface 131, which may also be referred to as a touch display screen or a touch panel, may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input terminal 132. Specifically, the another input terminal 132 may include, but is not limited to, one or more of a physical keyboard, a functional key (such as a volume control key or a switch key), a trackball, a mouse, and a joystick.

The display unit 140 may be configured to display information input by the user or information provided to the user, and various graphical user interfaces of the terminal 800. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 8, the touch-sensitive surface 131 and the display panel 141 are used as two separate components to implement input and output functions, in some embodiments, the touch-sensitive surface 131 and the display panel 141 may be integrated to implement the input function and output functions.

The terminal 800 may further include at least one sensor 150, for example, a light sensor, a motion sensor and other sensors. Specifically, the optical, sensor may include an ambient light sensor and a proximity sensor, where the ambient light sensor may adjust luminance of the display panel 141 according to brightness of the ambient light. The proximity sensor may switch off the display panel 141 and/or backlight when the terminal 800 is moved to the ear. As one type of motion sensor, a gravity acceleration sensor may detect magnitude of accelerations in various directions (generally on three axes), may detect magnitude and a direction of the gravity when static, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the terminal 800 are not further described herein.

The audio circuit 160, a loudspeaker 161, and a microphone 162 may provide an audio interface between the user and the terminal 800. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the terminal 800.

The terminal 800 may help, by using the transmission module 170, the user to receive and send e-mails, browse a webpage, access streaming media, and so on, which provides wireless broadband Internet access for the user. Although FIG. 8 shows the transmission module 170, it may be understood that the transmission module 170 is not a necessary component of the terminal 800, and when required, the transmission module may be omitted as long as the scope of the essence of the present disclosure is not changed.

The processor 180 is a control center of the terminal 800, and is connected to various parts of the mobile phone by using various interfaces and lines. By running or executing the software program and/or module stored in the memory 120, and invoking data stored in the memory 120, the processor 180 performs various functions and data processing of the terminal 800, thereby performing overall monitoring on the mobile phone. Optionally, the processor 180 may include the one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 500 may further include the power supply 190 (for example, a battery) that supplies power for various components. Preferably, the power supply may be logically connected to the processor 180 by using a power management system, so as to implement a function such as charging, discharging and power consumption management by using the power management system. The power supply 190 may further include one or more of a direct current or alternate current power supply, a re-charging system, a power supply fault detection circuit, a power supply converter or an inverter, a power supply status indicator, and any other components.

Although not shown in the figure, the terminal 800 may further include a camera, a Bluetooth module, and the like, and details are not further described herein. Specifically, in this embodiment, the display unit of the terminal is a touch screen display, and the terminal further includes a memory, and one or more programs, where the one or more programs are stored in the memory, and are configured to be executed by one or more processors. The one or more programs contain instructions used for performing the operations performed by the terminal in the foregoing embodiments.

Figure 9:
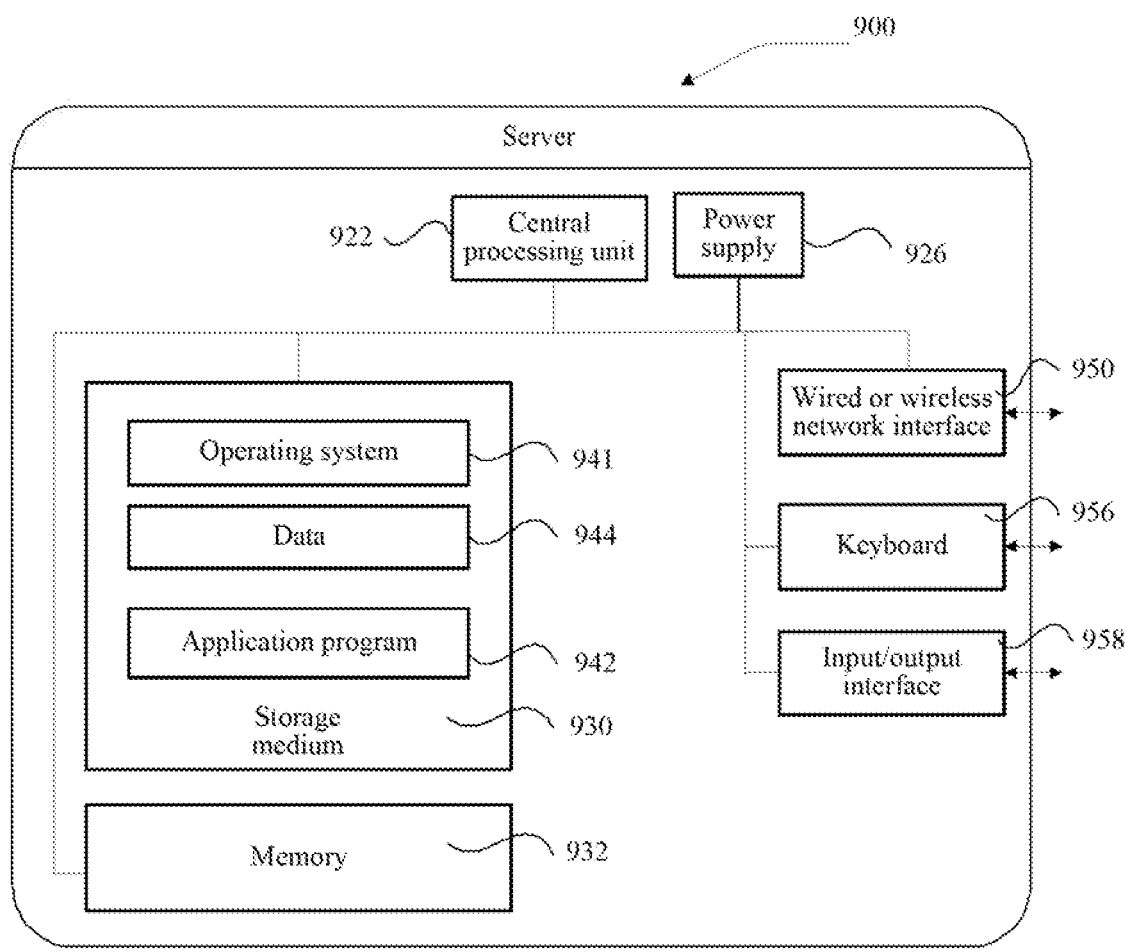
FIG. 9 is a schematic structural diagram of a server according to an embodiment of the present disclosure.

FIG. 9 is a schematic structural diagram of a server according to an embodiment of the present disclosure. The server 900 may vary greatly because of a different configuration or performance, and may include one or more central processing units (CPU) 922 (for example, one or more processors) and a memory 932, and one or more storage applications 942 or storage media 930 of data 944 (for example, one or more mass storage devices). The memory 932 and the storage medium 930 may be used for transient storage or persistent storage. A program stored in the storage medium 930 may include one or more modules (not marked in FIG. 7), and each module may include a series of instruction operations on the server. Even further, the CPU 922 may be set to be in communication with the storage medium 930, and perform, on the server 900, a series of instruction operations in the storage medium 930.

The server 900 may further include one or more power supplies 926, one or more wired or wireless network interfaces 950, one more input and output interfaces 958, one or more keyboards 956, and/or one or more operating systems 941, for example Windows Server™, Mac OS X™, Unix™, Linux™, FreeBSD™, or the like.

An exemplary embodiment further provides a non-transitory computer readable storage medium including instructions, for example, a memory including instructions. The foregoing instructions may be executed by a processor of a terminal or a processor of a server, to complete the foregoing interaction method based on recommended content. For example, the non-transitory computer readable storage medium may be a ROM, a RAM, a CD-ROM, a magnetic tape, a floppy disk, an optical data storage device, or the like.

For example, when the described functions are implemented as software function units, and are sold or used as independent products, they may be stored in a computer accessible storage medium. Based on such understanding, the technical solutions of the present disclosure, or the portions contributing to the prior art may be embodied in the form of a software product. The computer software product may be stored in a storage medium, and include several instructions to instruct a computer device (e.g., a personal computer, a server, or a network device) to execute all or some of the method steps of each embodiment disclosed herein. The storage medium described above may include portable storage device, ROM, RAM, a magnetic disc, an optical disc or any other media that may store program codes.

Further, the various functional units of various embodiments of the invention may be integrated into one processing unit, or may present individually. Two or more units may be integrated into one unit. The integrated unit may be realized in a hardware form, or in a form combining the hardware and software functional units.

A person of ordinary skill in the art may understand that all or some of the steps of the embodiment may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An interaction method based on recommended content, comprising:

receiving, by a user terminal comprising at least a processor, a playback instruction for a multimedia file;

in response to receiving the playback instruction, playing the multimedia file on the user terminal;

obtaining a recommended video corresponding to the multimedia file;

streaming, on a playback interface of the user terminal, the recommended video at a designated playback time point of the multimedia file;

displaying, after the recommended video has been streamed for a duration, at least one interaction option of the recommended video on the playback interface, the at least one interaction option including an evaluation option and a sharing option;

detecting, by the user terminal, a selection operation on one of the at least one interaction option on the playback interface;

in response to detecting the selection operation on one of the at least one interaction option, sending a request associated with the recommended video based on the selected interaction option to a server, the request carrying a content identifier of the recommended video, wherein the request is processed by the server based on the selected interaction option;

wherein the method further comprises:

in response to detecting the selection operation on the evaluation option for a first time, presenting a first animation effect corresponding to the evaluation option, adjusting a quantity of times of evaluation of the recommended video from a first quantity to a second quantity, and displaying the second quantity of times of evaluation in a designated display area, the first quantity of times of evaluation being received from the server; and in response to detecting the selection operation on the evaluation option for a second time, presenting a second animation effect corresponding to the evaluation option, restoring the quantity of times of evaluation of the recommended video to the first quantity of times of evaluation, and displaying the first quantity of times of evaluation in the designated display area, wherein sending the request associated with the recommended video based on the selected interaction option to the server comprises: sending a sharing request to the server in response to detecting the selection operation on the sharing option, wherein the sharing request carries the content identifier of the recommended video and a current login user identifier, and the sharing request is used by the server to share the recommended video to a dynamic-information presentation page of the user identifier according to the content identifier;

wherein sending the sharing request to the server in response to detecting the selection operation on the sharing option comprises:

obtaining the content identifier of the recommended video and the user identifier;

displaying a sharing interface of the recommended video, wherein the sharing interface is used by a user to confirm sharing of the recommended video;

displaying icons of multiple information presentation applications; and determining, from the icons of the multiple information presentation applications, a designated information presentation application corresponding to a selected icon.

2. The method according to claim 1, wherein, before streaming the recommended video at the designated playback time point of the multimedia file, the method further comprises:
receiving the designated playback time point sent by a server; or
obtaining the designated playback time point that is prestored.

3. The method according to claim 1, before the displaying an interaction option of the recommended video, further comprising:
in response to detecting a playback pause operation on the multimedia file in a process of playing the multimedia file, streaming the recommended video.

4. The method according to claim 1, wherein sending the request associated with the recommended video based on the selected interaction option to the server comprises: sending an evaluation request to the server, when the displaying of the evaluation option ends and a current quantity of times of evaluation of the recommended video is not the first quantity of times of evaluation, wherein the evaluation request carries the content identifier of the recommended video, and the evaluation request is used by the server to adjust a recorded quantity of times of evaluation of the recommended video.

5. The method according to claim 1, wherein the multimedia file is a video or an audio, and the recommended video is an advertisement video.

6. The method according to claim 5, further comprising:
pausing the playback of the multimedia file at the designated playback time point; and
streaming the recommended video at the same playback interface that has been playing the multimedia file.

7. An interaction method based on recommended content, comprising:
receiving, by a server comprising at least a processor, a recommended-content obtaining request from a terminal configured to play a multimedia file, the recommended-content obtaining request being used for requesting for a recommended video corresponding to the multimedia file;
sending, by the server, the recommended video corresponding to the multimedia file and a first quantity of times to the terminal, the terminal being configured to: stream the recommended video on a playback interface at a designated playback time point of the multimedia file, display, after the recommended video has been streamed for a duration, at least one interaction option of the recommended video on the playback interface, detect a selection operation on one of the at least one interaction option on the playback interface, adjust a quantity of times of evaluation of the recommended video from a first quantity to a second quantity in response to detecting the selection operation on an evaluation option for a first time, and restore the quantity of times of evaluation of the recommended video to the first quantity of times of evaluation in response to detecting the selection operation on the evaluation option for a second time;
receiving, by the server, an interaction request associated with the recommended video sent by the terminal, the interaction request being triggered by the selection operation on the interaction option and carrying a content identifier of the recommended video; and
processing, by the server the request associated with the recommended video based on the selected interaction option,
wherein the method further comprises:
obtaining a current login user identifier of the terminal in response to the interaction request associated with the recommended video being a sharing request, wherein the sharing request is generated by the terminal in response to detecting the selection operation on the sharing option, including: obtaining the content identifier of the recommended video and the user identifier; displaying a sharing interface of the recommended video, wherein the sharing interface is used by a user to confirm sharing of the recommended video; displaying icons of multiple information presentation applications; and determining, from the icons of the multiple information presentation applications, a designated information presentation application corresponding to a selected icon; and
sharing the recommended video to a dynamic-information presentation page of the user identifier.

8. The method according to claim 7, further comprising:
adjusting, in response to the interaction request associated with the recommended video being an evaluation request, a recorded quantity of times of evaluation of the recommended video according to the evaluation request.

9. The method according to claim 7, before the sending of the recommended video corresponding to the multimedia file to the terminal, further comprising:
obtaining the recommended video, wherein an attribute of the recommended video is the same as an attribute of recommended video that has been recommended by the terminal or recommended video that has been shared by the terminal.

10. The method according to claim 7, wherein before the sending of the recommended video corresponding to the multimedia file to the terminal, the method further comprises:
determining a popular recommended video set according to a quantity of times of evaluation and a quantity of times of sharing by the terminal in each recommended video set; and
sending the recommended video corresponding to the multimedia file to the terminal comprises:
sending recommended video that is in the popular recommended video set and that has not been played on the terminal to the terminal.

11. A system comprising:
a terminal comprising:
one or more processors, and a memory,
the memory storing one or more programs that, when being executed by the one or more processors, causing the one or more processors of the terminal to perform:
in response to receiving a playback instruction for a multimedia file, playing the multimedia file on the terminal;
obtaining a recommended video corresponding to the multimedia file;
streaming, on a playback interface, the recommended video at a designated playback time point of the multimedia file;
displaying, after the recommended video has been streamed for a duration, at least one interaction option of the recommended video on the playback interface;
detecting a selection operation on one of the at least one interaction option on the playback interface;
sending a request associated with the recommended video based on the selected interaction option to a server in response to detecting the selection operation on the interaction option, the request carrying a content identifier of the recommended video, wherein the request is processed by the server based on the selected interaction option;

in response to detecting the selection operation on a evaluation option for a first time, presenting a first animation effect corresponding to the evaluation option, adjusting a quantity of times of evaluation of the recommended video from a first quantity to a second quantity, and displaying the second quantity of times of evaluation in a designated display area, the first quantity of times of evaluation being received from the server; and in response to detecting the selection operation on the evaluation option for a second time, presenting a second animation effect corresponding to the evaluation option, restoring the quantity of times of evaluation of the recommended video to the first quantity of times of evaluation, and displaying the first quantity of times of evaluation in the designated display area, wherein sending the request associated with the recommended video based on the selected interaction option to the server comprises: sending a sharing request to the server in response to detecting the selection operation on a sharing option, wherein the sharing request carries the content identifier of the recommended video and a current login user identifier, and the sharing request is used by the server to share the recommended video to a dynamic-information presentation page of the user identifier according to the content identifier;

wherein sending the sharing request to the server in response to detecting the selection operation on the sharing option comprises:

obtaining the content identifier of the recommended video and the user identifier;

displaying a sharing interface of the recommended video, wherein the sharing interface is used by a user to confirm sharing of the recommended video;

displaying icons of multiple information presentation applications; and determining, from the icons of the multiple information presentation applications, a designated information presentation application corresponding to a selected icon.

12. The system according to claim 11, wherein the one or more programs further cause the one or more processors of the terminal to perform:

displaying the interaction option of the recommended video in a process of streaming the recommended video; or displaying the interaction option of the recommended video in a process of playing the multimedia file.

13. The system according to claim 11, further comprising:

the server, configured to perform:

receiving a recommended-content obtaining request from the terminal for the multimedia file, the recommended-content obtaining request being used for requesting for the recommended video corresponding to the multimedia file;

sending the recommended video corresponding to the multimedia file to the terminal;

receiving the interaction request sent by the terminal, the interaction request being triggered by the selection operation on the interaction option; and performing the request sent by the terminal based on the interaction option.

14. The system according to claim 13, wherein the server is further configured to perform:

determining a popular recommended video set according to a quantity of times of evaluation and a quantity of times of sharing by the terminal in each recommended video set; and sending recommended video that is in the popular recommended video set and that has not been played on the terminal to the terminal.

* * * * *